US009657779B2

(12) United States Patent
Kokumai et al.

(10) Patent No.: US 9,657,779 B2
(45) Date of Patent: May 23, 2017

(54) ROLLING BEARING CAGE, ROLLING BEARING, AND METHOD OF MANUFACTURING ROLLING BEARING CAGE

(71) Applicants: Hiromichi Kokumai, Mie (JP); Daichi Ito, Mie (JP); Naoki Ikemura, Mie (JP)

(72) Inventors: Hiromichi Kokumai, Mie (JP); Daichi Ito, Mie (JP); Naoki Ikemura, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/893,113

(22) PCT Filed: May 2, 2014

(86) PCT No.: PCT/JP2014/062127
§ 371 (c)(1),
(2) Date: Nov. 23, 2015

(87) PCT Pub. No.: WO2014/192503
PCT Pub. Date: Dec. 4, 2014

(65) Prior Publication Data
US 2016/0108965 A1    Apr. 21, 2016

(30) Foreign Application Priority Data
May 31, 2013    (JP) .................. 2013-115497

(51) Int. Cl.
*F16C 33/66*    (2006.01)
*F16C 19/06*    (2006.01)
(Continued)

(52) U.S. Cl.
CPC ...... *F16C 33/6696* (2013.01); *B29C 45/0025* (2013.01); *B29C 45/2628* (2013.01);
(Continued)

(58) Field of Classification Search
CPC .............. F16C 33/3862; F16C 33/3831; F16C 33/3856; F16C 33/3887; F16C 33/445;
(Continued)

(56) References Cited

U.S. PATENT DOCUMENTS 1,996,841 A * 4/1935 Stevens ............... F16C 33/3831
384/527
2,550,911 A * 5/1951 Cobb .................. F16C 33/3831
384/526
(Continued)

FOREIGN PATENT DOCUMENTS

DE         3424742 C1 * 11/1985 ............. B29C 33/10
DE         3718693 A1 * 12/1988 ......... B29C 45/0025
(Continued)

OTHER PUBLICATIONS

International Preliminary Report on Patentability and Written Opinion of the International Searching Authority issued Dec. 1, 2015 in International (PCT) Application No. PCT/JP2014/062127.
(Continued)

*Primary Examiner* — Alan B Waits
(74) *Attorney, Agent, or Firm* — Wenderoth, Lind & Ponack, L.L.P.

(57) ABSTRACT

A cage includes: an annular body having pocket holes for receiving balls; and a resin portion formed through injection molding of a resin containing a solid lubricant with the body being set as an insert component. The resin portion includes: first parts formed along inner peripheral surfaces of the pocket holes of the body to form pocket surfaces to be held in sliding contact respectively with the balls; and a second part formed along an outer peripheral surface (or inner peripheral surface) of the body to form a guide surface to be held in sliding contact with an outer ring (or inner ring). The first parts and the second part are formed integrally with each other. Weld lines of the resin portion are formed at
(Continued)

positions of avoiding exposure of the weld lines at both end portions of the pocket surfaces in a cage circumferential direction.

6 Claims, 10 Drawing Sheets

(51) Int. Cl.
| | |
|---|---|
| F16C 33/38 | (2006.01) |
| B29C 45/26 | (2006.01) |
| B29C 45/00 | (2006.01) |
| F16C 33/44 | (2006.01) |
| B29C 45/27 | (2006.01) |
| B29L 31/04 | (2006.01) |
| B29K 101/12 | (2006.01) |
| B29K 105/00 | (2006.01) |
| B29K 105/06 | (2006.01) |
| F16C 19/16 | (2006.01) |

(52) U.S. Cl.
CPC .......... *B29C 45/2708* (2013.01); *F16C 19/06* (2013.01); *F16C 33/3831* (2013.01); *F16C 33/3843* (2013.01); *F16C 33/3856* (2013.01); *F16C 33/3887* (2013.01); *F16C 33/445* (2013.01); *B29K 2101/12* (2013.01); *B29K 2105/0005* (2013.01); *B29K 2105/06* (2013.01); *B29L 2031/04* (2013.01); *B29L 2031/045* (2013.01); *F16C 19/163* (2013.01); *F16C 2208/04* (2013.01); *F16C 2220/04* (2013.01); *F16C 2300/52* (2013.01)

(58) Field of Classification Search
CPC .. F16C 33/3843; F16C 33/6696; F16C 19/06; F16C 19/163; F16C 2300/52; F16C 2220/04; F16C 2208/04; B29C 45/0025; B29C 45/2628; B29C 45/2708; B29L 2031/045; B29L 2031/04; B29K 2101/12; B29K 2105/0005; B29K 2105/06

See application file for complete search history.

(56) References Cited

U.S. PATENT DOCUMENTS

| | | | | | |
|---|---|---|---|---|---|
| 3,198,735 | A | * | 8/1965 | Devine | C10M 7/00 384/463 |
| 6,102,576 | A | * | 8/2000 | Toyota | F16C 33/32 384/492 |
| 6,682,224 | B2 | * | 1/2004 | Ooitsu | F16C 19/163 384/527 |
| 6,702,473 | B2 | * | 3/2004 | Kahlman | F16C 33/30 384/492 |
| 6,808,310 | B2 | * | 10/2004 | Ooitsu | F16C 19/163 384/492 |
| 6,926,447 | B2 | * | 8/2005 | Hamamoto | F16C 33/416 384/527 |
| 6,994,474 | B2 | * | 2/2006 | Kinno | C23C 14/0605 384/492 |
| 8,113,718 | B2 | * | 2/2012 | Ito | F02K 9/60 384/463 |
| 8,303,192 | B2 | * | 11/2012 | Yamada | F16C 33/3812 384/576 |
| 9,133,877 | B2 | * | 9/2015 | Yamazaki | F16C 33/3825 |
| 9,192,986 | B2 | * | 11/2015 | Shimazu | B22C 9/28 |
| 2002/0003912 | A1 | | 1/2002 | Ooitsu | |
| 2006/0210208 | A1 | * | 9/2006 | Ota | F16C 19/163 384/527 |
| 2008/0019623 | A1 | * | 1/2008 | Otsuka | F16C 33/3831 384/51 |
| 2009/0074339 | A1 | | 3/2009 | Ito et al. | |
| 2012/0039558 | A1 | * | 2/2012 | Shimazu | B22C 9/28 384/572 |
| 2012/0230622 | A1 | * | 9/2012 | Yabe | F16C 41/007 384/448 |

FOREIGN PATENT DOCUMENTS

| | | | | |
|---|---|---|---|---|
| EP | 1 170 521 | | 1/2002 | |
| EP | 2 006 560 | | 12/2008 | |
| GB | 924420 | A * | 4/1963 | ............. F16C 33/44 |
| JP | 62098029 | A * | 5/1987 | |
| JP | 2-20854 | | 5/1990 | |
| JP | 4-321815 | | 11/1992 | |
| JP | 2002-276671 | | 9/2002 | |
| JP | 2003-232363 | | 8/2003 | |
| JP | 2007-321926 | | 12/2007 | |
| JP | 2009-174631 | | 8/2009 | |
| JP | 2012107703 | A * | 6/2012 | |
| JP | 2012-179744 | | 9/2012 | |
| JP | 2012-237445 | | 12/2012 | |
| JP | 2013-46982 | | 3/2013 | |
| JP | 2013-47553 | | 3/2013 | |

OTHER PUBLICATIONS

International Search Report issued Jul. 22, 2014 in International (PCT) Application No. PCT/JP2014/062127.
Extended European Search Report issued Nov. 3, 2016 in counterpart European Patent Application No. 14803334.3.

* cited by examiner

ROLLING BEARING CAGE, ROLLING BEARING, AND METHOD OF MANUFACTURING ROLLING BEARING CAGE

TECHNICAL FIELD

The present invention relates to a rolling bearing cage (hereinafter simply referred to as "cage"), a rolling bearing comprising the cage, and to a method of manufacturing a cage.

BACKGROUND ART

Rolling bearings to be used in a turbopump for rocket engines are used under environments of high speed rotation in liquid propellant. In particular, in a case of using the rolling bearings in liquid hydrogen or liquid oxygen, the rolling bearings are exposed to ultra-low temperatures. Thus, fluid lubricants such as oil and grease for normal rolling bearings cannot be employed. Further, when the rolling bearings are used in high speed rotation, high hoop stress is applied to the cages, and hence the cages need to have high specific strength.

For example, in JP 02-20854 B, there is disclosed a cage made of a fiber-reinforced composite obtained by impregnating woven fabric made of a reinforced fiber such as a glass fiber with a solid lubricant such as PTFE. This cage is formed by machining the fiber-reinforced composite, and hence strands of the cut glass fiber are exposed on surfaces of the cage. When the strands of the glass fiber come into contact with rolling elements, contact between the rolling elements and the solid lubricant is hindered. As a result, the solid lubricant may not be sufficiently transferred onto the rolling elements, which causes a risk of deterioration in reliability of resistance against frictional abrasion. As a countermeasure, according to JP 02-20854 B, after the machining of the fiber-reinforced composite, the strands of the glass fiber, which are exposed on the machined surface portions, are removed through dissolution with a surface treatment agent (hydrofluoric acid).

TECHNICAL PROBLEM

However, in the cage as disclosed in JP 02-20854 B, the strands of the glass fiber are exposed when the surfaces of the cage are abraded deeper than hydrofluoric acid-treated layers on the surfaces. As a result, as described above, the risk of deterioration in reliability of the resistance against frictional abrasion is caused. Meanwhile, when the hydrofluoric acid-treated layers are formed thicker so as to prevent the exposure of the strands of the glass fiber, there are disadvantages in that a manufacturing lead time is increased due to prolongation of a time period of the hydrofluoric acid treatment, and that the strength of the cage is decreased due to reduction in the amount of the glass fiber.

SUMMARY OF INVENTION

It is therefore an object of the present invention to provide a cage capable of avoiding insufficiency of lubrication, increase in manufacturing lead time, and decrease in strength even when fluid lubricants cannot be employed.

SOLUTION TO PROBLEM

According to one embodiment of the present invention, which is devised to achieve the above-mentioned object, there is provided a rolling bearing cage, which is arranged between a pair of raceway rings and configured to retain rolling elements at predetermined positions, the rolling bearing cage comprising: an annular body having pocket holes for receiving the rolling elements; and a resin portion formed through injection molding of a resin containing a solid lubricant with the annular body being set as an insert component, wherein the resin portion comprises: first parts formed along inner peripheral surfaces of the pocket holes of the annular body to form pocket surfaces to be held in sliding contact respectively with the rolling elements; and a second part formed along an inner peripheral surface or an outer peripheral surface of the annular body to form a guide surface to be held in sliding contact with one of the pair of raceway rings, the first parts and the second part being formed integrally with each other, and wherein weld lines of the resin portion are formed at positions of avoiding exposure of the weld lines at both end portions of the pocket surfaces in a circumferential direction of the rolling bearing cage.

In this way, according to the cage of the one embodiment of the present invention, the pocket surfaces to be held in sliding contact respectively with the rolling elements and the guide surface to be held in sliding contact with the raceway ring are formed of the resin containing the solid lubricant. Thus, lubrication can be performed by transferring the solid lubricant contained in the resin onto the rolling elements and the raceway ring. In this case, the strength of the cage can be secured with the body, and hence a reinforcing material to be blended into the resin portion can be reduced or omitted. With this, a risk in that a large amount of the glass fiber or the like is exposed on the pocket surfaces and the guide surface, which are formed of the resin portion, can be avoided. Thus, the insufficiency of lubrication can be prevented. In addition, the hydrofluoric acid treatment need not be performed, and hence the increase in manufacturing lead time and the decrease in strength of the cage can be prevented.

By the way, during rotation of the rolling bearing, a radial load and errors at the time of mounting cause the rolling elements to be moved relative to the cage (cause lead or lag) in the cage circumferential direction. Thus, the rolling elements frequently come into contact with both the end portions of the pocket surface in the cage circumferential direction. As a countermeasure, as described above, the fragile weld lines of the resin portion are formed at the positions of avoiding exposure at both the end portions of the pocket surfaces in the cage circumferential direction. With this, reliability of the cage can be enhanced. Specifically, the weld lines may be formed only on one side of the pocket surfaces in a cage axial direction (refer to FIG. 3), formed on both sides of the pocket surfaces in the cage axial direction (refer to FIG. 6), or may be formed at column portions between the pocket surfaces (refer to FIG. 8).

It is preferred that a thickness of the first parts of the resin portion, which form the pocket surfaces, be set larger in consideration of abrasion as a result of contact with the rolling elements. However, when the thickness of the first parts is increased without changing a size of the cage, a thickness of the body is decreased in accordance therewith. As a result, there is caused a risk of deficiency in strength of the body. In particular, in the rolling bearing to be rotated at high speed, high hoop stress is applied to the cage due to a centrifugal force. Thus, when a thickness of an annular part formed on both sides of the pocket surface in the cage axial direction is small in the cage axial direction, there is caused a risk of deficiency in strength against the hoop stress.

In order to avoid the risks as described above, for example, a thickness at both end portions of each of the first parts of the resin portion in the cage circumferential direction may be set larger than a thickness at both end portions of each of the first parts of the resin portion in the cage axial direction. In this way, when the thickness at both the end portions of each of the first parts of the resin portion in the cage circumferential direction is set relatively large, an allowable amount of the abrasion as a result of the contact with the rolling elements is increased to achieve higher reliability. Further, when the thickness at both the end portions of each of the first parts of the resin portion in the cage axial direction is set relatively small, the thickness of the body (in particular, thickness of the annular part formed on both the sides of the pocket surface in the cage axial direction) can be increased in the cage axial direction in accordance therewith. With this, the cage can be enhanced in strength against the hoop stress.

Recessed portions may be formed in the guide surface formed along the second part of the resin portion. With this, liquid films (for example, liquid films of propellant for turbopumps of rocket engines) are easily formed in a gap between the guide surface and the raceway ring, which are held in sliding contact with each other. With this, lubricity and abrasion resistance are enhanced.

When the recessed portions are formed on a surface of the body so that the resin portion enters the recessed portions, the body and the resin portion can be firmly fixed to each other by an anchoring effect. As such recessed portions, there may be employed fine recessed portions formed through surface roughening such as etching and shot-blasting, and relatively large recessed portions formed through machining and the like.

The cage described above may be used by being built into a rolling bearing comprising a pair of raceway rings and rolling elements. Such rolling bearings are suited to use under non-lubricated environments.

The cage described above can be manufactured by forming the resin portion through the injection molding of the resin material containing the solid lubricant with the body, which has the pocket holes for receiving the rolling elements, being set as an insert component so that the resin portion comprises: the first parts formed along the inner peripheral surfaces of the pocket holes of the body to form the pocket surfaces to be held in sliding contact respectively with the rolling elements; and the second part formed along the inner peripheral surface or the outer peripheral surface of the body to form the guide surface to be held in sliding contact with the one of the raceway rings, the first parts and the second part being formed integrally with each other.

A gate for injecting the material of the resin portion is formed along a molding surface of a die configured to perform the injection molding of the resin portion. The molding surface is configured to form one end surface of the second part of the resin portion in the axial direction. With this, a position of the gate in the cage circumferential direction can be freely set on the molding surface, and hence the weld lines of the resin portion can be formed at desired positions (positions of avoiding exposure at both the end portions of the pocket surfaces in the cage circumferential direction).

For example, when a disc gate is used as the gate, the weld lines are formed only on one side of the pocket surfaces in the cage axial direction (refer to FIG. 3 and FIG. 4). Further, pin gates may be used as the gate. In this case, when the pin gates are arranged on the molding surface correspondingly to regions between the pocket surfaces in the cage circumferential direction, the weld lines are formed on both the sides of the pocket surface in the cage axial direction (refer to FIG. 6 and FIG. 7). Further, when the pin gates are arranged on the molding surface correspondingly to circumferential positions that correspond to central portions of the pocket surfaces in the cage circumferential direction, the weld lines are formed at column portions between the pocket surfaces (refer to FIG. 8 and FIG. 9).

ADVANTAGEOUS EFFECTS OF INVENTION

As described above, according to the one embodiment of the present invention, even when fluid lubricants cannot be employed in the rolling bearing, the insufficiency of lubrication, the increase in manufacturing lead time, and the decrease in strength of the cage can be avoided.

DESCRIPTION OF EMBODIMENTS

Figure 1:
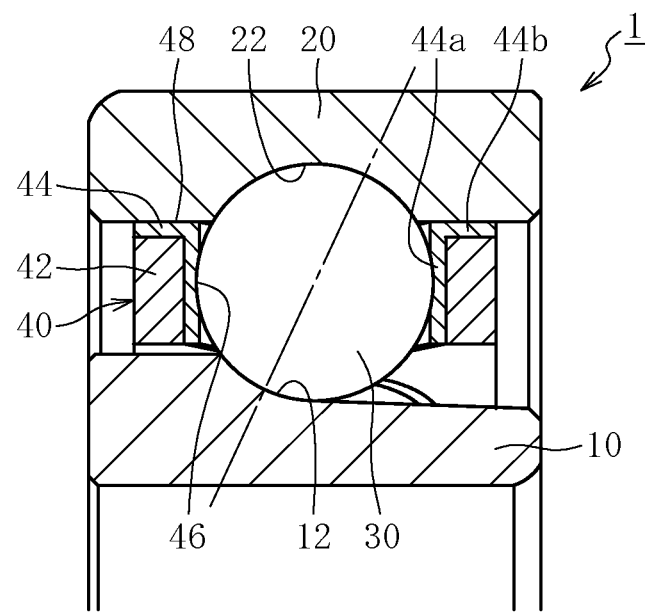
FIG. 1 is a sectional view for illustrating a rolling bearing (angular contact ball bearing) according to an embodiment of the present invention.

In FIG. 1, an angular contact ball bearing 1 is illustrated as a rolling bearing according to an embodiment of the present invention. The angular contact ball bearing 1 comprises a pair of raceway rings (inner ring 10 and outer ring 20), a plurality of rolling elements (balls 30), and a cage 40. The angular contact ball bearing 1 is used under non-lubricated environments, specifically, under such an environment that fluid lubricants such as oil and grease are not used. The angular contact ball bearing 1 of this embodiment has an inner diameter (inner diameter of the inner ring 10) of from approximately 10 mm to approximately 100 mm, and an axial dimension of from approximately 10 mm to approximately 40 mm. As in the illustration, the angular contact ball bearing 1 forms a contact angle. The contact angle is defined as an angle to be formed by a plane perpendicular to a bearing center axis (radial plane) and an action line of a resultant force transmitted from the raceway rings to the rolling element (indicated by the dashed line in FIG. 1).

An outer peripheral surface of the inner ring 10 has a raceway surface 12, and an inner peripheral surface of the outer ring 20 has a raceway surface 22. The inner ring 10 and the outer ring 20 are each made of a metal such as martensitic stainless steel (SUS 440C and the like). The plurality of balls 30 are arranged between the raceway surface 12 of the inner ring 10 and the raceway surface 22 of the outer ring 20. The balls 30 are each made of a metal such as martensitic stainless steel (SUS 440C and the like), or a ceramic material. Note that, films of sputtered PTFE may be formed on the raceway surface 12 of the inner ring 10, the raceway surface 22 of the outer ring 20, and surfaces of the balls 30 so as to suppress initial friction.

The cage 40 is arranged between the outer ring 20 and the inner ring 10. The angular contact ball bearing 1 of this embodiment is what is called an outer ring-guide bearing configured to guide the cage 40 in a radial direction by bringing an outer peripheral surface of the cage 40 and the inner peripheral surface of the outer ring 20 (specifically, shoulder surfaces formed on both sides of the raceway surface 22 in a cage axial direction) into sliding contact with each other.

Figure 2:
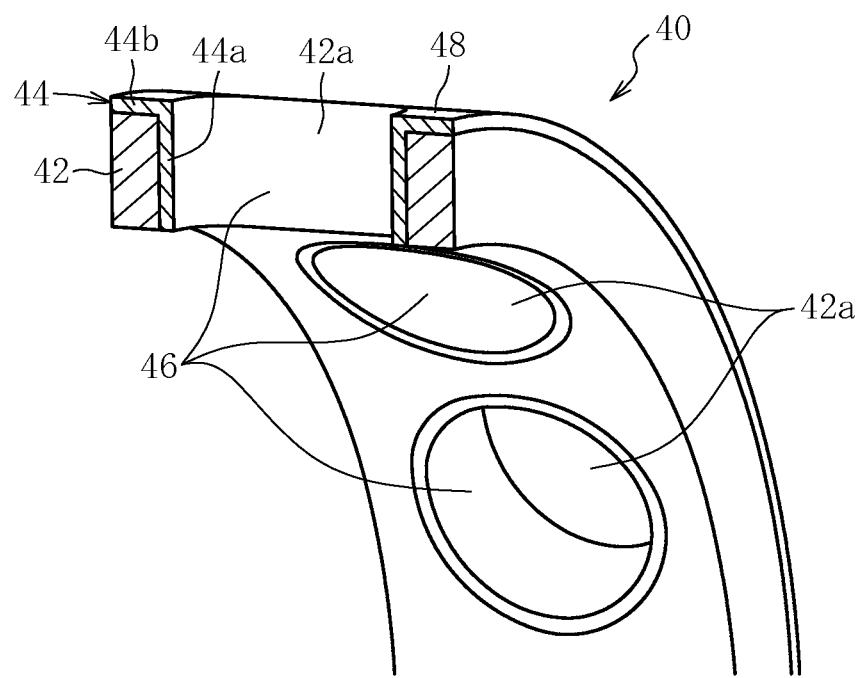
FIG. 2 is a sectional perspective view for illustrating a cage of the rolling bearing.

The cage 40 comprises a body 42 and a resin portion 44. The body 42 is formed into an annular shape, specifically, into a cylindrical shape in the illustrated example. As illustrated in FIG. 2, a plurality of pocket holes 42a are formed equiangularly through the body 42, and one ball 30 is received in each pocket hole 42a. The body 42 is made of a material that is higher in strength than the resin portion 44, such as resin composites and metals. As the resin composites, there may be used fiber-reinforced plastic materials such as CFRP and GFRP. Further, as the metals, there may be used ingot materials or sintered metals of, for example, an aluminum alloy, a magnesium alloy, carbon steel, stainless steel, and a copper alloy. In particular, as for bearings to be used under environments of high speed rotation, it is preferred that materials having high specific strength be used. As the materials having high specific strength, there are given, for example, CFRP, GFRP, an aluminum alloy, a titanium alloy, and a magnesium alloy. Further, as for bearings to be used in a liquid hydrogen turbopump, it is preferred that materials having low hydrogen reactivity be used. As the materials having low hydrogen reactivity, there are given, for example, CFRP, GFRP, and an aluminum alloy. Still further, as for bearings to be used in a liquid oxygen turbopump, it is preferred that materials having low oxidative reactivity be used. As the materials having low oxidative reactivity, there is given, for example, GFRP.

The resin portion 44 is formed through injection molding with the body 42 being set as an insert component so that first parts 44a and a second part 44b are formed integrally with each other. The first parts 44a are formed along inner peripheral surfaces of the pocket holes 42a of the body 42. In the illustrated example, the first part 44a covers the entire cylindrical inner peripheral surface of the pocket hole 42a. A surface (inner peripheral surface) of the first part 44a formed in each of the pocket holes 42a functions as a pocket surface 46 to be held in sliding contact with the rolling element 30. The second part 44b is formed along an outer peripheral surface of the body 42. In the illustrated example, the second part 44b covers the entire cylindrical outer peripheral surface of the body 42. A surface (outer peripheral surface) of the second part 44b functions as a guide surface 48 to be held in sliding contact with the inner peripheral surface of the outer ring 20. A thickness of the first parts 44a and a thickness of the second part 44b are equal to each other. It is preferred that the thicknesses be set to 0.1 mm or more in consideration of fluidity at the time of the injection molding, more preferably, 0.2 mm or more in consideration of reliability of abrasion resistance.

Figure 3:
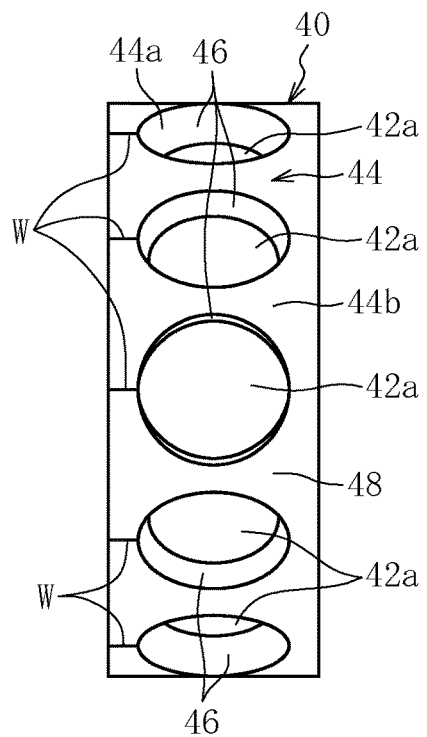
FIG. 3 is a side view for illustrating the cage.

As illustrated in FIG. 3, weld lines W are formed in the resin portion 44. The weld lines W are formed at positions of avoiding exposure at both end portions of the pocket surfaces 46 in a cage circumferential direction. In this embodiment, the weld lines W are formed only on one side of the pocket surface 46 in the cage axial direction (left side in FIG. 3). The weld lines W are formed at circumferential positions corresponding to central portions of the pocket surfaces 46 in the cage circumferential direction, and extend substantially in the cage axial direction. One end of the weld line W is exposed to one end surface of the second part 44b in the cage axial direction, and another end of the weld line W is exposed to one end portion of the pocket surface 46 in the cage axial direction.

The resin portion 44 is made of a resin containing a solid lubricant. As a main-component resin thereof, there may be used thermoplastic resins such as polyether ether ketone (PEEK), polyphenylene sulfide (PPS), and polyamide (PA). In particular, in a case of use in ultra-low-temperature environments, in view of shock resistance, chemical resistance, and close contact to the body 42, it is desired that PEEK having a small linear expansion coefficient be used. As the solid lubricant, there may be used a fluorine resin (such as PTFE), molybdenum disulfide, graphite, and the like.

The resin forming the resin portion 44 may be blended with a reinforcing material. It is desired that the reinforcing material having effects of enhancing abrasion resistance and suppressing a linear expansion coefficient of the cage be used. For example, a glass fiber (GF), a carbon fiber (CF), and magnesium oxide may be used. Note that, the reinforcing material may be omitted.

It is preferred that the main-component resin (thermoplastic resin) of the above-mentioned resin be blended at 45 vol % or more so that the injection molding can be performed. Further, in consideration of lubricity, the solid lubricant needs to be blended at 5 vol % or more. In particular, when the solid lubricant is used under the ultra-low-temperature environments as in liquid nitrogen, liquid oxygen, and the like, it is preferred that the solid lubricant be blended at 20 vol % or more. Further, when a blending ratio of the solid lubricant exceeds 40 vol %, the solid lubricant is hardly mixed with the main-component resin at the time of kneading. As a result, dispersibility at the time of the injection molding is deteriorated. Therefore, it is preferred that the blending ratio of the solid lubricant be set to from 20 vol % to 40 vol %. In addition, although the reinforcing material need not necessarily be blended, the reinforcing material may be blended at a ratio of from 0 vol % to 15 vol % in accordance with required abrasion resistance and linear expansion coefficient. Therefore, in the above-mentioned resin, for example, the main-component resin is blended at a ratio of from 45 vol % to 80 vol %, the solid lubricant is blended at a ratio of from 20 vol % to 40 vol %, and the reinforcing material is blended at a ratio of from 0 vol % to 15 vol %.

Figure 16:
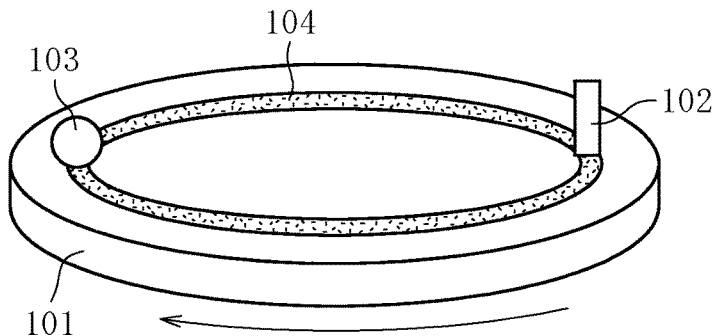
FIG. 16 is a perspective view for illustrating a pin-on-ball-on-disc tester.
Figure 17:
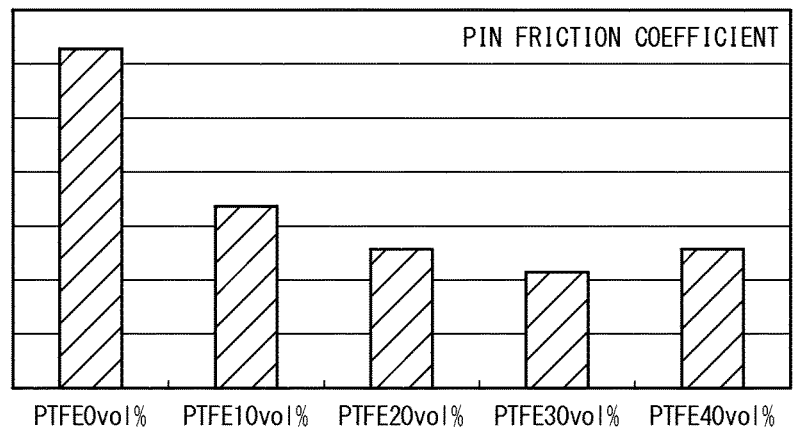
FIG. 17 is a graph for showing friction coefficients of a pin of the tester in accordance with variation in blending ratio of a solid lubricant contained in the pin.
Figure 18:
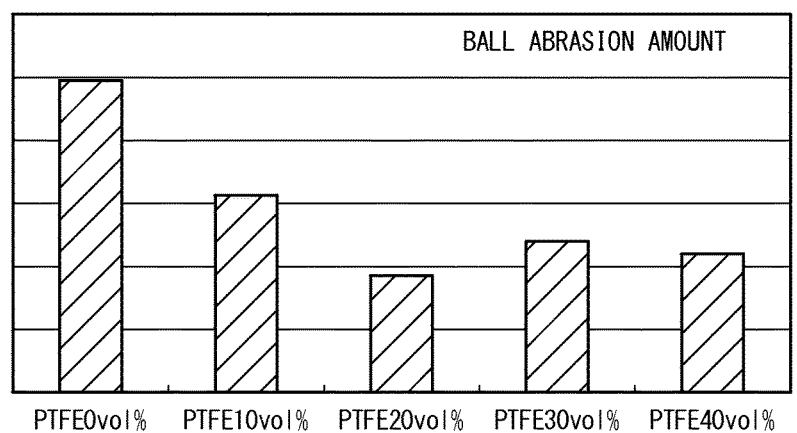
FIG. 18 is a graph for showing abrasion amounts of a ball in accordance with the variation in blending ratio of the solid lubricant contained in the pin of the tester.

In order to confirm a preferred blending ratio of the solid lubricant of the resin portion 44 under the ultra-low-temperature environments, frictional abrasion tests were conducted in the liquid nitrogen (under the ultra-low-temperature environment) by using a pin-on-ball-on-disc tester 100 illustrated in FIG. 16. Specifically, under a state in which a pin 102 made of the resin containing the solid lubricant (PTFE) and a ball 103 made of stainless steel are concyclically arranged and pressed against an upper surface of a disc 101 set in the liquid nitrogen, the disc 101 is rotated at a predetermined number of rotations. At this time, the solid lubricant contained in the resin of the pin 102 is transferred to the upper surface of the disc 101, and a transfer film 104 is formed. Such tests were conducted by using a plurality of pins 102 that are different from each other in blending ratio of the solid lubricant so as to confirm, correspondingly to compositions of the pins 102, coefficients of friction of the pins 102 against the disc 101 during the rotation of the disc 101, and abrasion amounts of the ball 103 after the rotation of the disc 101 for a predetermined time period. The results of the tests are shown in FIG. 17 and FIG. 18. In FIG. 17, the friction coefficients of the pins 102, that is, lubricities of the resin composites are shown, and the friction coefficients are decreased when the blending ratio of PTFE is 20 vol % or more. In FIG. 18, the abrasion amounts of the ball 103, that is, lubricities of the transfer films 104 are shown, and the abrasion amounts are substantially uniform when the blending ratio of PTFE is 20 vol % or more as in FIG. 17. Based on the results, it was confirmed that the preferred blending ratio of the solid lubricant particularly under the ultra-low-temperature environment was 20 vol % or more.

When the angular contact ball bearing 1 described above is rotated, the pocket surfaces 46 of the cage 40 and the balls 30 are held in sliding contact with each other, and the guide surface 48 (outer peripheral surface) of the cage 40 and the inner peripheral surface (shoulder surfaces) of the outer ring 20 are held in sliding contact with each other. With this, the solid lubricant on the resin portion 44 is transferred onto the surfaces of the balls 30 and the shoulder surfaces of the outer ring 20, and hence lubrication is performed between the cage 40, the balls 30, and the outer ring 20. Further, lubrication is performed between the balls 30 and the raceway surface 12 of the inner ring 10 and between the balls 30 and the raceway surface 22 of the outer ring 20 by the solid lubricant transferred onto the balls 30.

As described above, when the cage 40 comprises the body 42 and the resin portion 44, the strength of the cage 40 can be secured with the body 42. With this, the reinforcing material to be blended into the resin of the resin portion 44 can be reduced or omitted. As a result, a large amount of the reinforcing material contained in the resin portion 44 is not exposed on the pocket surfaces 46 or the guide surface 48. Thus, the transfer of the solid lubricant from the resin portion 44 to the sliding contact counterparts (balls 30 or outer ring 20) is not hindered, and hence the lubricity can be enhanced.

Further, during the rotation of the angular contact ball bearing 1, the movement of the balls 30 relative to the cage 40 (lead or lag) occurs in the cage circumferential direction. Thus, the balls 30 frequently come into contact with both the end portions of the pocket surfaces 46 of the cage 40 in the cage circumferential direction. As a countermeasure, as described above, the weld lines W of the resin portion 44 having low strength are formed in regions out of both the end portions of the pocket surfaces 46 in the cage circumferential direction. With this, those parts can be increased in strength.

Next, description is made of a method of manufacturing the cage 40 described above.

First, the body 42 is formed. Specifically, the body 42 is made of a resin composite of a resin that contains reinforcing fiber such as carbon fiber and glass fiber. Alternatively, the body 42 is made of a metal (ingot material) through machining (such as cutting) or plastic working (press working or forging) of the metal. Alternatively, the body 42 is made of a sintered metal through sintering of a green compact formed by compressing mixed metal powder at a predetermined sintering temperature.

After that, in order to enhance the close contact between the body 42 and the resin portion 44, fine recessed portions are formed in the surface of the body 42. The fine recessed portions are formed through surface roughening such as etching processes (sodium etching, plasma etching, and the like), shot-blasting, and thermal spraying. It is preferred that the body 42 after the surface roughening have a surface roughness larger than an amount of a dimensional variation in a cage radial direction due to a difference in linear expansion coefficient between the body 42 and the resin portion 44. For example, when the body 42 is made of an aluminum alloy (having a linear expansion coefficient of $24 \times 10^{-6}$ [1/° C.]), the resin portion 44 is made of a GF-reinforced PEEK-based material (having a linear expansion coefficient of $34 \times 10^{-6}$ [1/° C.]), and when the pocket surfaces 46 each have a diameter of 8 mm, it is desired that the body 42 have a surface roughness Ra of 10 μm or more. Note that, the surface roughening may be omitted. For example, when the body 42 is made of the sintered metal, numerous fine pores are formed in the surface of the body 42. For this reason, the surface roughing is not necessary.

Figure 4:
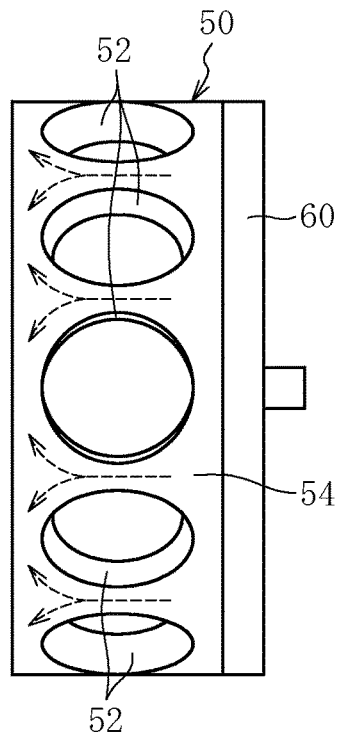
FIG. 4 is a schematic side view for illustrating a cavity for forming a resin portion of the cage.
Figure 5:
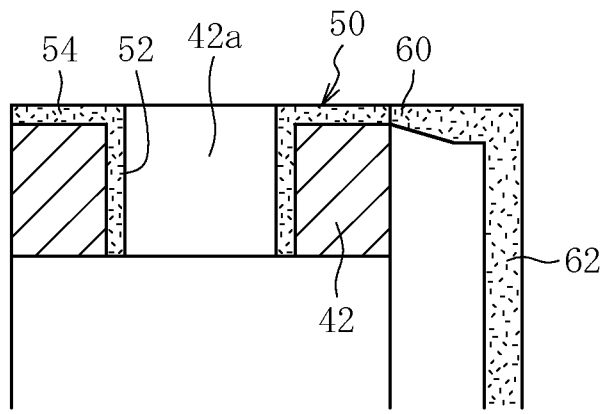
FIG. 5 is a sectional view for illustrating the cavity.

After that, the resin portion 44 is formed through injection molding with the body 42 being set as an insert component. A cavity 50 of an injection molding die to be used at this time is illustrated in FIG. 4 and FIG. 5. The cavity 50 comprises first cavities 52 for forming the first parts 44a of the resin portion 44, and a second cavity 54 for forming the second part 44b. A gate 60 is formed along a molding surface for forming the second cavity 54, specifically, along a molding surface for forming another end surface of the second part 44b in the cage axial direction (right side in FIG. 4 and FIG. 5). The gate 60 of this embodiment is an annular disc gate extending in the cage axial direction from an entire periphery of a radially outer end of a disc-like runner 62. Note that, FIG. 5 is a view for illustrating a state in which the cavity 50, the gate 60, and the runner 62 are filled with a resin (indicated by a dotted pattern).

When the resin is injected into the cavity 50 through the gate 60, the resin flows as indicated by the dotted-line arrows in FIG. 4, and streams of the resin merge at positions on one side of the first cavities 52 in the cage axial direction (left side in FIG. 4). The weld lines W are formed at those merging parts (refer to FIG. 3). Further, the molten resin enters the fine recessed portions in the surface of the body 42 and is cured therein. With this, the body 42 and the resin portion 44 are firmly fixed to each other.

After the resin is cured, the die is opened so that the cage 40 is taken out. At the same time when the die is opened, the resin cured in the gate 60 is torn off. As a result, gate cutting marks are left in the cage 40. Specifically, gate cutting marks are annularly left along the another end surface of the second part 44b of the resin portion 44 in the cage axial direction. After the cage 40 is taken out of the die, machining is performed on the another end surface of the cage 40 in the axial direction, to thereby remove the gate cutting marks. Further, machining may be performed so as to finish one or both the pocket surfaces 46 and the guide surface 48, or an entire surface of the cage 40. Note that, unless particularly necessary, the above-mentioned machining may be omitted.

Figure 6:
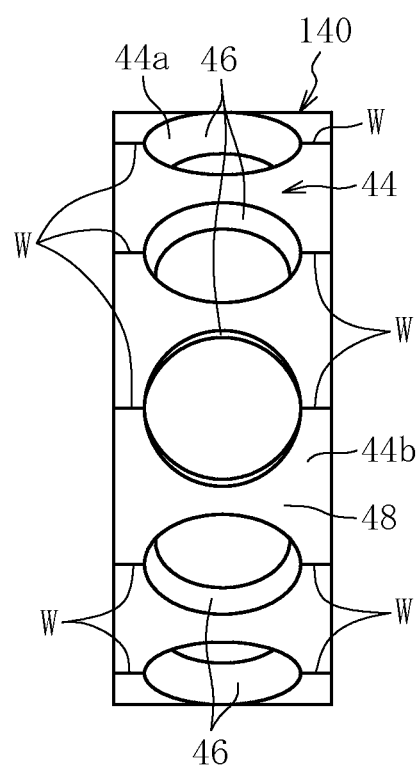
FIG. 6 is a side view for illustrating a cage according to another embodiment of the present invention.
Figure 7:
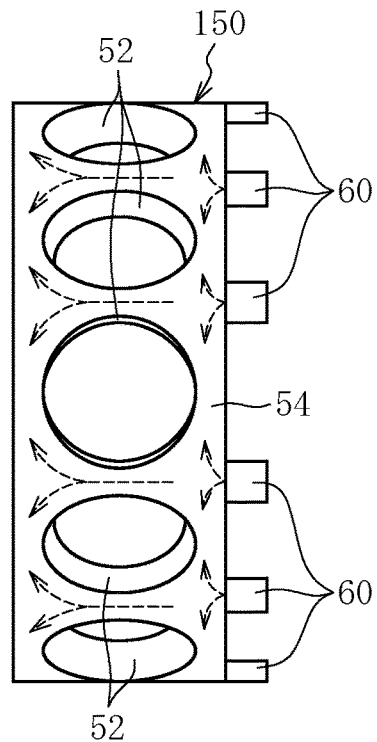
FIG. 7 is a schematic side view for illustrating a cavity for forming a resin portion of the cage of FIG. 6.

The present invention is not limited to the embodiment described above. A cage 140 illustrated in FIG. 6 is different from the cage of the embodiment described above in position of the weld lines W. Specifically, the weld lines W are formed on both sides of each of the pocket surfaces 46 in the cage axial direction. A cavity 150 for forming the resin portion 44 of the cage 140 is illustrated in FIG. 7. Gates 60 of this embodiment are pin gates, which are arranged along a molding surface for forming the cavity 150, specifically, along a molding surface for forming the another end surface of the second part 44b in the cage axial direction (right side in FIG. 7). The gates 60 are arranged at a plurality of equiangular positions. In the illustrated example, the gates 60 are arranged correspondingly to circumferential regions between the plurality of first cavities 52 for forming the pocket surfaces 46. When the resin is injected through the gates 60, the resin flows as indicated by the dotted-line arrows in FIG. 7, and streams of the resin merge at positions on both sides of the first cavities 52 in the cage axial direction. The weld lines W are formed at those merging parts (refer to FIG. 6).

Figure 8:
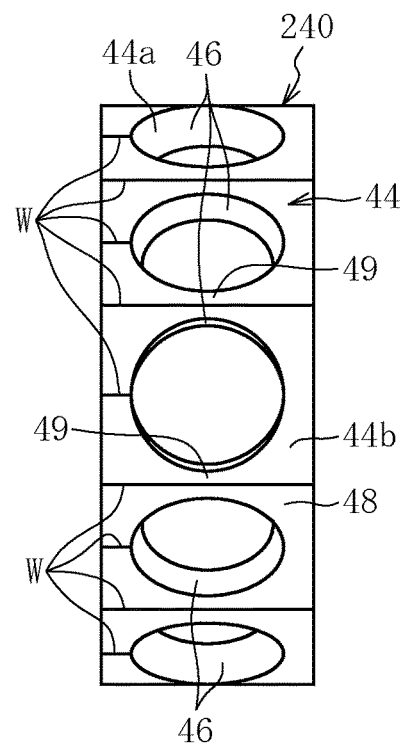
FIG. 8 is a side view for illustrating a cage according to still another embodiment of the present invention.
Figure 9:
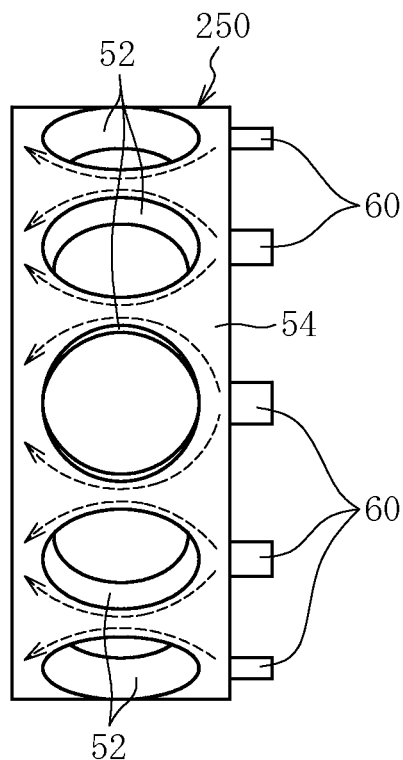
FIG. 9 is a schematic side view for illustrating a cavity for forming a resin portion of the cage of FIG. 8.

A cage 240 illustrated in FIG. 8 is different from the cages of the embodiments described above in position of the weld lines W. Specifically, the weld lines W are formed at column portions 49 between the pocket surfaces 46 in the cage circumferential direction, and on the one side of each of the pocket surfaces 46 in the cage axial direction (left side in FIG. 8). A cavity 250 for forming the resin portion 44 of the cage 240 is illustrated in FIG. 9. Gates 60 of this embodiment are pin gates, which are arranged along a molding surface for forming the cavity 250, specifically, along a molding surface for forming the another end surface of the second part 44b in the cage axial direction (right side in FIG. 9). The gates 60 are arranged at a plurality of equiangular positions. In the illustrated example, the gates 60 are arranged at circumferential positions corresponding to the central portions in the cage circumferential direction between the plurality of first cavities 52 for forming the pocket surfaces 46. When the resin is injected through the gates 60, the resin flows around the first cavities 52 as indicated by the dotted-line arrows in FIG. 9, and streams of the resin merge at positions between the first cavities 52 in the cage circumferential direction and on the one side of the first cavities 52 in the cage axial direction. The weld lines W are formed at those merging parts (refer to FIG. 8).

Figure 10:
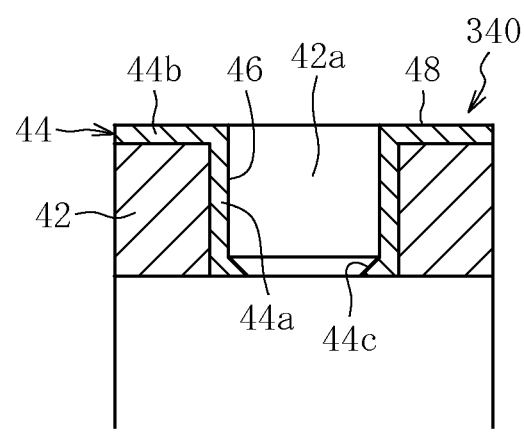
FIG. 10 is a sectional view for illustrating a cage according to yet another embodiment of the present invention.

A cage 340 illustrated in FIG. 10 is different from the cages of the embodiments described above in that projections 44c are formed so as to prevent the balls 30 from dropping off. Specifically, the projection 44c is formed so as to project to a radially inner side of the pocket surface 46 along an end portion of the first part 44a of the resin portion 44 on a cage radially inner side. In the illustrated example, the projection 44c is formed along an entire periphery of the pocket surface 46. Note that, the projection 44c may be formed at a plurality of positions spaced apart from each other in a circumferential direction of the pocket surface 46.

Figure 11:
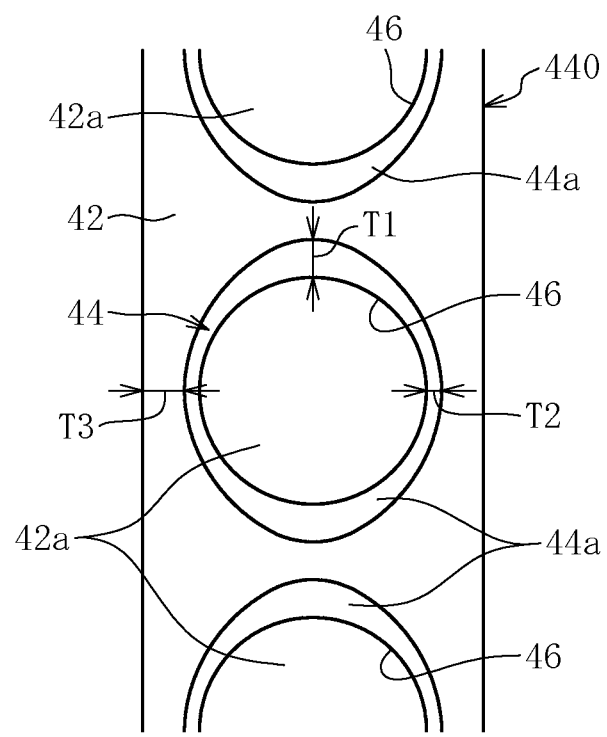
FIG. 11 is a side view for illustrating a cage according to yet another embodiment of the present invention.

FIG. 11 is a side view for illustrating a cage 440 according to yet another embodiment of the present invention as viewed from the radially inner side. The cage 440 is different from the cages of the embodiments described above in that a thickness T1 at both end portions of the first part 44a of the resin portion 44 in the cage circumferential direction is larger than a thickness T2 at both end portions thereof in the cage axial direction (T1>T2). In this way, when the thickness T1 of both the end portions of the first part 44a in the cage circumferential direction, which is easily brought into contact with the ball 30, is set larger, an allowable abrasion amount is increased to achieve higher reliability. Meanwhile, when the thickness T2 of both the end portions of the first part 44a in the cage axial direction is set smaller, a thickness T3 of an annular part on both sides of the pocket hole 42a in the cage axial direction can be accordingly increased in the body 42. With this, the strength against hoop stress can be increased.

Figure 12A:
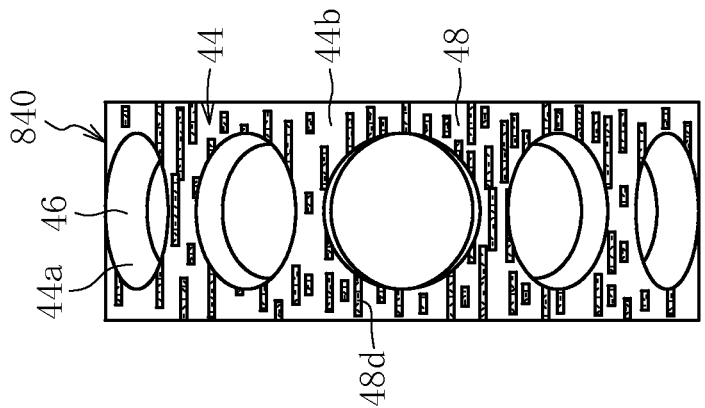
FIG. 12(a) is a side view for illustrating a cage according to yet another embodiment of the present invention.
Figure 12B:
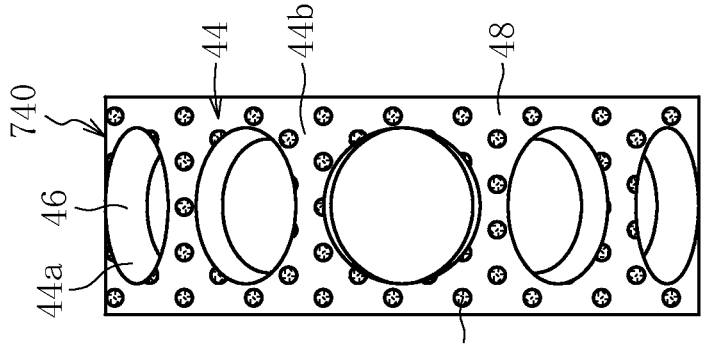
FIG. 12(b) is a side view for illustrating a cage according to yet another embodiment of the present invention.
Figure 12C:
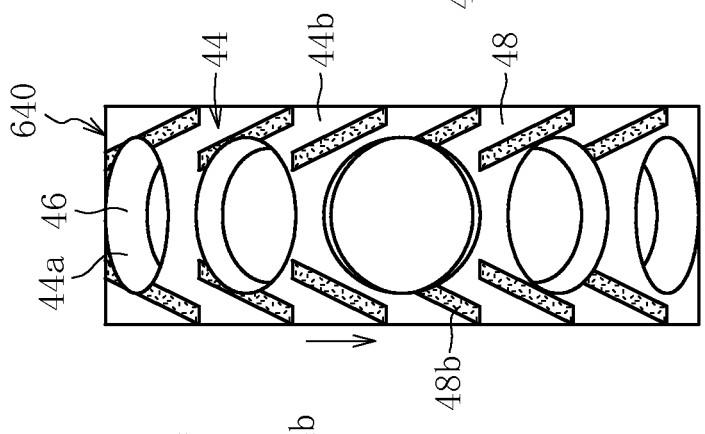
FIG. 12(c) is a side view for illustrating a cage according to yet another embodiment of the present invention.
Figure 12D:
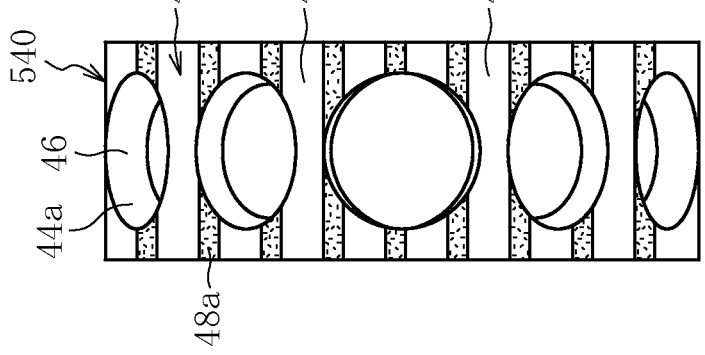
FIG. 12(d) is a side view for illustrating a cage according to yet another embodiment of the present invention.

In cages 540 to 840 illustrated in FIG. 12(a) to FIG. 12(d), recessed portions (dotted regions) are formed in the guide surface 48. When the recessed portions are formed in the guide surface 48 in this way, liquid films (for example, liquid films of propellant for turbopumps) are easily formed in a gap between the guide surface 48 and the raceway ring (in this embodiment, inner peripheral surface of the outer ring 20) that are held in sliding contact with each other. With this, lubricity and abrasion resistance are enhanced. Specifically, in the guide surface 48 of the cage 540 of FIG. 12(a), a plurality of grooves 48a extending in the cage axial direction are formed as the recessed portions. The grooves 48a are formed in a stepped pattern at equal intervals in the cage circumferential direction. In the guide surface 48 of the cage 640 of FIG. 12(b), grooves 48b serving as the recessed portions are equiangularly formed in a herringbone pattern inclined in symmetry with respect to a cage axial center. For example, in a case where the surface illustrated in FIG. 12(b) is rotated in the direction of the arrow, when the grooves 48b are inclined so as to be spread on a forward side in the rotation direction toward both end portions in the cage axial direction as in the illustration, the liquid films are supplied toward the cage axial center along with the rotation of the cage 640. With this, lubricity can be enhanced. In the guide surface 48 of the cage 740 of FIG. 12(c), dimple-like recessed portions 48c are formed. In the guide surface 48 of the cage 840 of FIG. 12(d), relatively short grooves 48d serving as the recessed portions are arranged in a distributed pattern. The grooves 48d in the illustrated example extend in the cage axial direction. Note that, although similar weld lines W to those described above are formed in each of the cages 540 to 840 of FIG. 12, the illustration of the weld lines W is omitted.

A most advantageous effect can be obtained when a depth of each of the recessed portions described above is set to from approximately 1 μm to approximately 4 μm. However, in consideration of abrasion of the resin portion 44, it is preferred that the depth be set approximately equivalent to the gap between the guide surface 48 and the outer ring 20 in FIG. 1, specifically, set to 50 μm or less. For example, when projection portions are formed in a forming die, the recessed portions as described above can be formed at the time of injection molding. Further, the recessed portions as described above may be formed also through machining (such as lathing) or shot-blasting of the guide surface after the resin portion 44 is formed.

Figure 13:
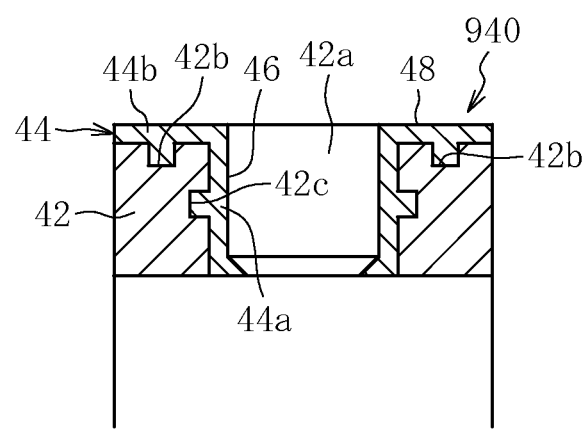
FIG. 13 is a sectional view for illustrating a cage according to yet another embodiment of the present invention.
Figure 14:
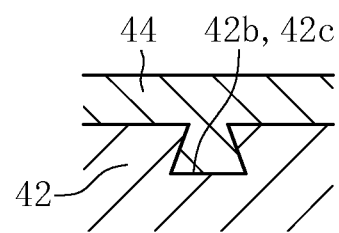
FIG. 14 is a sectional view for illustrating a cage according to yet another embodiment of the present invention.

A cage 940 illustrated in FIG. 13 is different from the cages of the embodiments described above in pattern of the recessed portions to be formed in the surface of the body 42. Specifically, in the outer peripheral surface of the body 42, more specifically, on both the sides of the pocket holes 42a in the cage axial direction, annular grooves 42b serving as the recessed portions are formed continuously along the cage circumferential direction. Further, in the inner peripheral surface of each of the pocket holes 42a of the body 42, an annular groove 42c serving as the recessed portion is formed continuously along the circumferential direction of the pocket hole 42a. Those grooves 42b and 42c are formed, for example, through machining or plastic working. Note that, the recessed portions to be formed in the body 42 may be grooves extending in directions other than the directions described above, and dimple-like recessed portions. Further, the recessed portions may be formed in any one of the outer peripheral surface of the body 42 and the inner peripheral surface of each of the pocket holes 42a. Still further, as illustrated in FIG. 14, when a width of each of the recessed portions 42b and 42c is set smaller on a depth side than on an opening side, an effect of retaining the resin portion 44 can be enhanced. Yet further, when the above-mentioned surface roughening is performed not only on the grooves 42b and 42c but also on the surface of the body 42, the body 42 and the resin portion 44 are more firmly fixed to each other.

In the embodiments described above, the outer ring-guide rolling bearings configured to guide the cage 40 by bringing the cage 40 into sliding contact with the inner peripheral surface of the outer ring 20 are illustrated. However, the present invention is not limited thereto, and is applicable also to an inner ring-guide rolling bearings configured to guide the cage 40 by bringing the cage 40 into sliding contact with the outer peripheral surface of the inner ring 10. In this case, the second part 44b of the resin portion 44 is formed along an inner peripheral surface of the body 42, and the inner peripheral surface of the second part 44b functions as the guide surface 48 (not shown).

Figure 15:
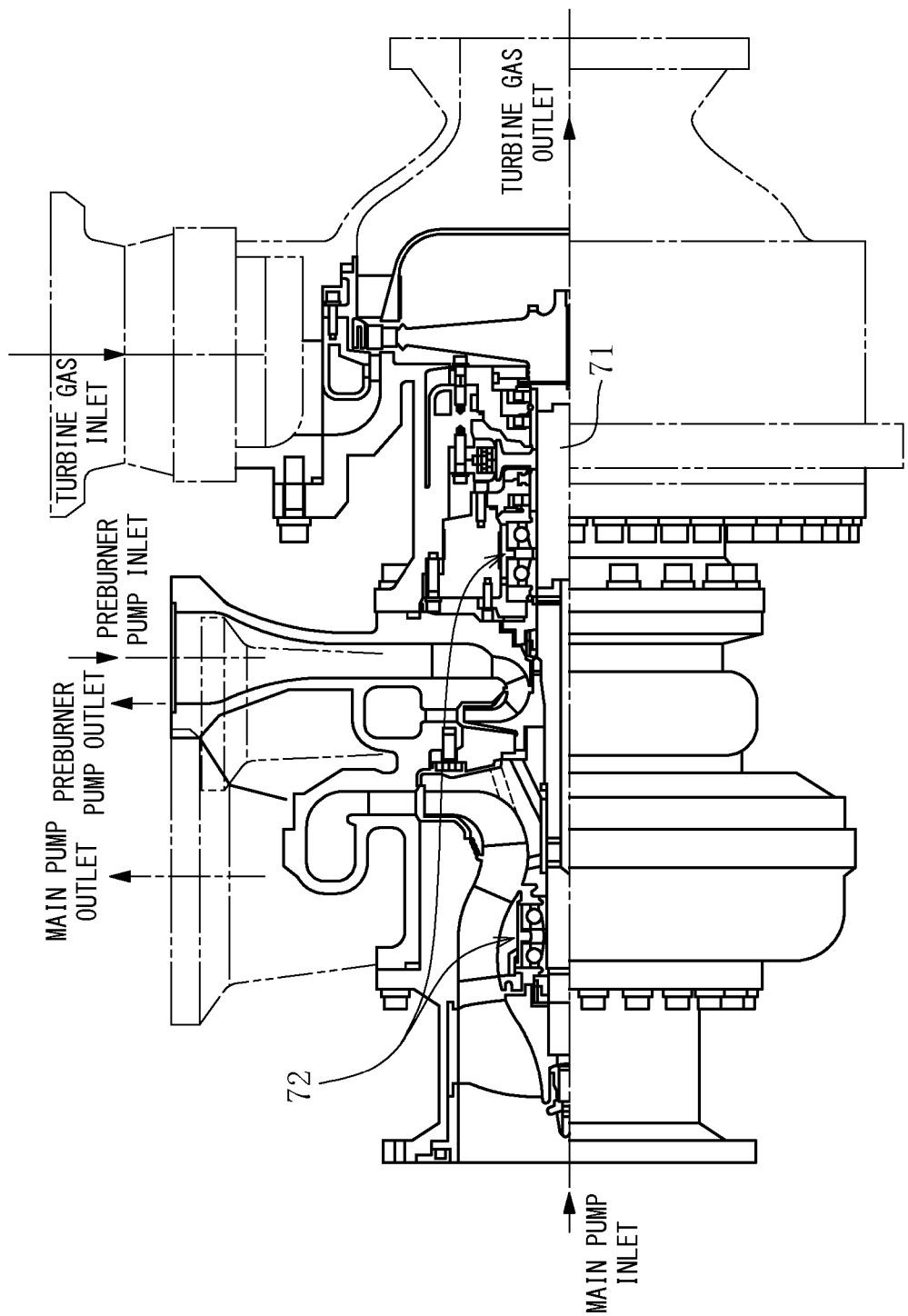
FIG. 15 is a sectional view for illustrating a turbopump for rocket engines having the rolling bearings built therein.

A turbopump for rocket engines having the angular contact ball bearings 1 descried above built therein is illustrated in FIG. 15. In a liquid hydrogen/liquid oxygen staged combustion rocket engine, this turbopump is configured to compress a liquid oxygen gas. Note that, although not shown, this staged combustion rocket engine also comprises a similar turbopump configured to compress a liquid hydrogen gas. A turbine shaft 71 of the turbopump is configured to be initially driven by a combustion gas of the liquid fuel, which enters a preburner pump inlet and flows to a preburner pump outlet, and then fully driven by the combustion gas of the liquid fuel, which enters a turbine gas inlet and flows to a turbine gas outlet. Then, the liquid oxygen gas flowing into a main pump inlet is compressed and discharged through a main pump outlet to be supplied into a combustion chamber. The turbine shaft 71 is made of a nickel-based superalloy having high fatigue strength under ultra-low temperature, such as an Inconel material. The turbine shaft 71 is supported by double-row angular contact ball bearings 72 each obtained by combining two angular contact ball bearings 1. In the pair of angular contact ball bearings 1 forming the double-row angular contact ball bearings 72, contact angles are formed in symmetry with respect to a plane orthogonal to an axis.

The angular contact ball bearing 1 described above is applicable not only to the turbopump for rocket engines, but also to other uses. For example, the angular contact ball bearing 1 described above may be built into apparatus to be used in vacuum environments, such as space apparatus including artificial satellites. Further, the angular contact ball bearing 1 described above is not limited to use under the ultra-low-temperature environments, and may be used, for example, under environments of a normal temperature or higher.

Still further, in the above-mentioned embodiments, the angular contact ball bearings are described as rolling bearings according to the present invention, but the present invention is not limited thereto. The present invention is applicable also to ball bearings of other types, and to roller bearings such as a cylindrical roller bearing and a tapered roller bearing.

REFERENCE SIGNS LIST 1 angular contact ball bearing
10 inner ring
20 outer ring
30 ball
40 cage
42 body
42a pocket hole
44 resin portion
44a first part
44b second part
46 pocket surface
48 guide surface
50 cavity
52 first cavity
54 second cavity
60 gate
W weld line

The invention claimed is:

1. A rolling bearing cage, which is arranged between a pair of raceway rings and configured to retain rolling elements at predetermined positions, the rolling bearing cage comprising:
   an annular body having pocket holes for receiving the rolling elements; and
   a resin portion formed through injection molding of a resin containing a solid lubricant with the annular body being set as an insert component,
   wherein the resin portion comprises:
      first parts covering entire inner peripheral surfaces of the pocket holes of the annular body to form pocket surfaces to be held in sliding contact with the rolling elements, respectively; and
      a second part formed along an inner peripheral surface or an outer peripheral surface of the annular body to form a guide surface to be held in sliding contact with one of the pair of raceway rings,
      the first parts and the second part being formed integrally with each other, and
   wherein a thickness at both end portions of each of the first parts of the resin portion in a circumferential direction of the rolling bearing cage is larger than a thickness at both end portions of each of the first parts of the resin portion in an axial direction of the rolling bearing cage.

2. The rolling bearing cage according to claim 1, wherein weld lines of the resin portion are formed only on one side of the pocket surfaces in the axial direction of the rolling bearing cage.

3. The rolling bearing cage according to claim 1, wherein a main-component resin of the resin portion contains:
- a thermoplastic resin blended at a ratio of from 45 vol % to 80 vol %;
- a solid lubricant blended at a ratio of from 20 vol % to 40 vol %; and
- a reinforcing material blended at a ratio of from 0 vol % to 15 vol %.

4. A rolling bearing, comprising:
the rolling bearing cage of claim 1;
a pair of raceway rings; and
rolling elements.

5. A method of manufacturing a rolling bearing cage, the rolling bearing cage being arranged between a pair of raceway rings and configured to retain rolling elements at predetermined positions, the method comprising forming a resin portion through injection molding of a resin material containing a solid lubricant with an annular body, which has pocket holes for receiving the rolling elements, being set as an insert component so that the resin portion comprises:

first parts covering entire inner peripheral surfaces of the pocket holes of the annular body to form pocket surfaces to be held in sliding contact with the rolling elements, respectively, a thickness at both end portions of each of the first parts of the resin portion in a circumferential direction of the rolling bearing cage being larger than a thickness at both end portions of each of the first parts of the resin portion in an axial direction of the rolling bearing cage; and a second part formed along an inner peripheral surface or an outer peripheral surface of the annular body to form a guide surface to be held in sliding contact with one of the pair of raceway rings, the first parts and the second part being formed integrally with each other, wherein a gate for injecting the resin material of the resin portion is formed along a molding surface for forming one end surface of the second part of the resin portion in the axial direction of the rolling bearing cage.

6. The method of manufacturing a rolling bearing cage according to claim 5, wherein the gate comprises a disc gate.

* * * * *